United States Patent [19]
Recker et al.

[11] Patent Number: 5,605,745
[45] Date of Patent: Feb. 25, 1997

[54] TOUGHENED THERMOSETTING STRUCTURAL MATERIALS

[75] Inventors: Hans G. Recker, Irvine, Calif.; J. Timothy Hartness, Tega Cay, S.C.; Thomas Folda, Neuleiningen, Germany; Helmut Tesch, Birkenheide, Germany; Thomas Weber, Ludwigshafen, Germany; Jack D. Boyd, Westminster, Calif.

[73] Assignee: Cytec Technology Corp., Wilmington, Del.

[21] Appl. No.: 366,392

[22] Filed: Dec. 29, 1994

Related U.S. Application Data

[63] Continuation of Ser. No. 221,334, Mar. 31, 1994, abandoned, which is a continuation of Ser. No. 339,273, Apr. 14, 1989, abandoned.

[51] Int. Cl.$^6$ .................................................. B32B 5/16
[52] U.S. Cl. .......................... 442/175; 428/408; 428/413; 428/902; 525/415; 427/212; 427/386; 442/179
[58] Field of Search ................................ 428/209, 283, 428/294, 408, 902, 413; 525/415; 427/212, 386

[56] References Cited

U.S. PATENT DOCUMENTS

| | | | |
|---|---|---|---|
| 3,647,751 | 3/1972 | Darsow et al. | 260/49 |
| 4,567,216 | 1/1986 | Qureshi et al. | 523/400 |
| 4,604,319 | 8/1986 | Evans et al. | 428/290 |
| 4,608,404 | 8/1986 | Gardner et al. | 523/400 |
| 4,644,039 | 2/1987 | Boyd et al. | 525/422 |
| 4,656,207 | 4/1987 | Jabloner et al. | 523/400 |
| 4,656,208 | 4/1987 | Chu et al. | 523/400 |
| 4,789,722 | 12/1988 | Jabloner et al. | 528/172 |
| 4,859,533 | 8/1989 | Seiya et al. | 428/366 |
| 4,874,661 | 10/1989 | Browne et al. | 428/246 |
| 4,908,088 | 3/1990 | Boyd et al. | 156/307.3 |
| 5,028,478 | 7/1991 | Odagiri et al. | 428/283 |

FOREIGN PATENT DOCUMENTS

| | | |
|---|---|---|
| 0252725A3 | 1/1988 | European Pat. Off. . |
| 0326177A3 | 8/1989 | European Pat. Off. . |
| 0367053A2 | 5/1990 | European Pat. Off. . |
| 0377194 | 7/1990 | European Pat. Off. . |

OTHER PUBLICATIONS

European Search Report European Patent Appln. 90106513.6.
Bucknall and Partridge, "Phase Separation in Epoxy Resins Containing Polyurethersulfone," *Polymer* 24 639–646 (1983).

*Primary Examiner*—James J. Bell
*Attorney, Agent, or Firm*—Bernard Lau

[57] ABSTRACT

The incorporation of 2 to 35 μm particles of a differentially soluble engineering thermoplastic into heat curable epoxy resin systems significantly increases the toughness of such systems without loss of other desirable properties. These toughened epoxy resin systems are useful in preparing carbon fiber reinforced composites having compression strength after impact (CAI) of greater than 45. Ksi 310 MPa after a 1500 in-lb/in impact.

35 Claims, No Drawings

TOUGHENED THERMOSETTING STRUCTURAL MATERIALS

This is a continuation of application Ser. No. 08/221,334, filed Mar. 31, 1994 now abandoned, which in turn is a continuation of application Ser. No. 07/339,273, filed Apr. 14, 1989, now abandoned.

BACKGROUND OF THE INVENTION

1. Field of the Invention

The subject matter of the present invention concerns toughened, thermosetting structural materials. More particularly, the subject matter involves structural materials which exhibit superior toughness, or resistance to impact-induced damage. Such materials find uses in many applications, particularly the aerospace field, as matrix resins for fiber reinforced prepregs, the composites prepared therefrom, and as structural adhesives.

2. Description of the Related Art

Although many thermoplastics are tough, ductile materials, their use in structural materials has been minimal for several reasons. First, many of the thermoplastics do not have the required, solvent resistance, thermal stability, and high softening points required in demanding aerospace applications. Second, the high temperature engineering thermoplastics are difficult to process, often requiring both high temperature and pressure to produce acceptable fiber reinforced parts.

For these reasons, and despite the proliferation and improvement of high temperature, high performance thermoplastics, thermosetting systems currently remain the important commercial resin systems. Of the thermosets available, by far the most common are the epoxies, the bismaleimides, and the cyanates. Each of these resin systems has its own unique set of physical and chemical attributes, but all are glassy, generally crosslinked systems which tend to be brittle. Thus attempts at toughening such systems have become increasingly important.

By the term toughness is meant resistance to impact induced damage. Toughness in cured neat resin samples may be assessed by the critical stress intensity factor, $K_{1C}$, among others. Toughness in fiber reinforced composites prepared by laying up and subsequently curing numerous plies of prepregs is best assessed by measuring the compression strength after an impact of suitable energy. Generally, an impact of 1500 in-lb/in is used, and compression after impact (CAI) values measured in accordance with Boeing test BSS 7260 on a quasiisotropic $[+45/0/-45/90]_{4s}$ layup. Alternatively, other measures of toughness such as laminate $G_{IIC}$ are used.

Elastomers have been used with good success in toughening a number of thermosetting resins, particularly epoxy resins. Examples of such systems are given in Bauer, *Epoxy Resin Chemistry II*, Chapters 1–5, ACS Symposium Series 221, American Chemical Society, Washington, D.C., 1983. Both soluble and infusible elastomers have been utilized, the former generally increasing flexibility at the expense of physical properties such as tensile modulus, while the latter generally increase toughness without substantially affecting bulk properties. Both types of modification generally lead to lower thermal properties, an effect which can be minimized when polysiloxane elastomers are utilized.

Soluble thermoplastics have also been used, for example in the article by Bucknall and Partridge, "Phase Separation in Epoxy Resins Containing Polyethersulfone," *Polymer* 24 639–646 (1983). In Bucknall's examples, dissolution of up to 17 percent by weight of a polyethersulfone having a molecular weight above 20,000 Daltons in an epoxy formulation increased toughness by up to 50 percent. At the highest levels, phase separation was noted upon cure of the system, the resulting cured neat resin consisting of the glassy polyethersulfone discontinuous phase dispersed within a glassy epoxy continuous phase. With epoxy resins having an average functionality of four, no phase separation was observed, although the cured system still displayed enhanced toughness.

Toughened systems have also been proposed which rely for toughness, on the use of oligomeric curing agents or monomers. Such monomers and curing agents have less crosslink density and thus are inherently more flexible, tougher systems. In U.S. Pat. No. 4,608,404, for example, epoxy resin systems containing an epoxy resin and an oligomeric amine-terminated polyethersulfone are disclosed. Such systems were capable of providing composites having CAI (compression after impact, see infra) values of greater than 30 Ksi, particularly when diaminodiphenylsulfone (DDS) was used as a co-curative.

In U.S. Pat. Nos. 4,656,207 and 4,656,208, the principles of Bucknall and Partridge and of the '404 patentees were logically combined to provide epoxy systems employing DDS and greater than 25 percent by weight of a reactive polyethersulfone oligomer having a molecular weight of from 2000 to 10,000 Daltons. These epoxy systems cure into two phase systems having a glassy discontinuous phase dispersed throughout a glassy continuous phase as disclosed by Bucknall but utilizing a lower molecular weight, and thus more soluble and less viscous, polyethersulfone oligomer. Carbon fiber reinforced composites employing the resin systems of the '207 and '208 patents are able to achieve CAI values in excess of 40 Ksi although solvent resistance is compromised. Other researchers have utilized analogous technologies with bismaleimide resins.

In U.S. Pat. No. 4,604,319, discrete films of thermoplastic, optionally containing up to 40 percent by weight thermosetting resin, are applied under heat and pressure to epoxy or bismaleimide prepregs containing carbon fibers as reinforcement. When such film faced prepregs are laminated together to form a composite, CAI values greater than 40 Ksi can be obtained. Unfortunately, such prepregs have not been accepted by the industry due to the possibility of a mistake during layup wherein two thermoplastic films might abut each other, promoting catastrophic interlaminar separation. Furthermore, such prepregs have little tack, and thus make composite layup difficult.

In European patent EP-A-0 252 725, elastomeric interlayers are formed in situ in a dual phase epoxy/polyethersulfone resin system by the filtering out of discrete, infusible rubbery elastomer particles by the fiber reinforcement because the particles are larger (10–75 µm) than the fiber interstices. Prepregs such as these and composites formed therefrom have the capability of having CAI values in the 40–50 Ksi range, but may suffer from lower properties at elevated temperatures.

In European patent EP-A-0 274 899, the addition of thermoplastics, preferably in the form of solid, spherical particles, to thermosettable resin systems is said to cause an increase in toughness. Examples of thermoplastics are polyamideimides, polybutyleneterephthalate, and nylon, with transparent nylons being preferred. When particles greater than 2 µm in diameter are utilized, the thermoplastic is concentrated in situ onto the outside of the prepreg as in EP-A-0 252 725. When particles having a size less than 2 μm are used, the thermoplastic remains more or less homogenously dispersed within the prepreg. The thermoplastics, after curing, are distributed in the matrix resin as individual particles, as agglomerates, or, in the case where the size is greater than 2 μm, as continuous or semicontinuous films of a distinct thermoplastic phase, these layers exhibiting remnants of particulate or aglomerated particulate character.

SUMMARY OF THE INVENTION

It has now been found that the concept of toughening thermosetting resins by the addition of thermoplastics in particulate form is much too general, and that the addition of some thermoplastics even cause the toughness of the cured resin to be less than that of the unmodified resin. Thus as an initial consideration, it appears impossible to predict with any degree of accuracy, the behavior of broad classes of thermoplastics in a base resin system. However it has further been discovered that certain thermoplastics may be utilized to toughen resin systems effectively. These toughened resins are most advantageously used as matrix resins in fiber reinforced heat curable prepregs.

DESCRIPTION OF THE PREFERRED EMBODIMENTS

The present invention concerns the addition of a select group of differentially soluble, amorphous thermoplastics to epoxy resin systems in order to provide increased toughness, and, in particular, significant resistance to impact induced damage. The differentially soluble, amorphous thermoplastics are added to the epoxy resin preferably by means of a slurry mixing process by means of which virtually all of the thermoplastic remains in particulate form having a mean size between 2 and 30 μm in the neat uncured matrix resin. During the prepregging of fiber reinforcement, a substantial amount of these particles are filtered out by the reinforcing fibers, forming a thermoplastic particle-rich zone substantially exterior to the fibers. Following cure, the differentially soluble amorphous thermoplastic forms a non-phase-separated concentration gradient in the interlaminar zone containing both thermoplastic and epoxy resin.

The epoxy resins useful in the process of the subject invention are those which have an average functionality greater than about 1.8, preferably greater than 2.0. These resins are denominated in the claims as "bis- or higher functional epoxy resins". Such epoxy resins are well known to those skilled in the art, and numerous examples may be found in the *Handbook of Epoxy Resins*, Lee and Neville, McGraw-Hill, publishers; © 1967; *Epoxy Resins, Chemistry and Technology*, 2d Ed., Clayton May, Ed., Marcel Dekker, © 1988; and U.S. Pat. Nos. 4,608,404; 4,604,319; and 4,656,207, which are herein incorporated by reference. Particularly preferred are the epoxy resins which are the glycidyl derivatives of phenolated dicyclopentadiene and/or dicyclopentadiene oligomers, as taught by U.S. Pat. No. 3,536,734. Also preferred are the glycidyl ethers of the bisphenols such as bisphenol A, bisphenol F, bisphenol S and bisphenol K, and the glycidyl ethers of the cresol and phenol based novolacs. Further suitable are the glycidyl derivatives of amines and aminophenols, particularly p-aminophenol, aniline, phenylenediamine, and 4,4'-, 2,4'-, 2,2'- and other methylenedianilines.

In addition to the epoxy resin component, the subject invention resin systems must contain a differentially soluble amorphous thermoplastic, preferably a differentially soluble amorphous polysulfone. By the term "differentially soluble" is meant an amorphous thermoplastic whose solubility in the epoxy resin system at the mix temperature is minimal while solubility at the cure temperature is both rapid and total. Such thermoplastics have a solubility curve which is relatively steep between the respective preparation and cure temperatures. Preferably, the amorphous thermoplastic does little more than swell at the mixing temperature, for example, but completely dissolves at the cure temperature.

The requisite degree of differential solubility in a particular epoxy resin system may be assessed by simple tests. First, the amorphous thermoplastic, ground to a particle size of less than 30 μm, preferably with a mean particle size within the range of 8–18 μm, is added in solid form to the remaining liquified resin system components. The particle sizes discussed herein are mean particle sizes determined from volume particle size distribution using a Brinkman Particle Size Analyser PSA 2010. If the particles, after occasional agitation for approximately ten minutes or so at the mix temperature apparently do little more than swell in the resin, then their mixing temperature solubility is suitable for practice of the subject invention. In the worst case, the thermoplastic may show a solubility of approximately 10–20 weight percent over this time span.

Next, the cure temperature solubility must be assessed. To assess this solubility, the complete resin system, containing from 10 to about 50 weight percent of differentially soluble amorphous thermoplastic powder, is cured at the normal cure temperature. This test is conveniently performed on a heated microscope stage, but may also be performed using any convenient method of neat resin plaque preparation. If the thermoplastic completely dissolves in the resin system prior to or contemporaneous with the resin gel time such that a monophasic system results, then the cure temperature solubility is suitable for use in the subject invention.

By the term "completely dissolves" which is used in the previous paragraph is meant that substantially complete dissolution takes place. All particles having particle sizes less than 20 μm should dissolve. However, as all thermoplastic powders contain a range of particle sizes, it is possible that microscopic examination may show occasional large particles, especially those above 30 μm size, which remain only partially dissolved in the resin. When such particles of a suitable thermoplastic are observed, it is frequently possible to observe well defined convection bands around the particles by phase contrast microscopy. Such convection bands are further indication of the suitability of the particular differentially soluble thermoplastic in the subject invention, as they are evidence of rapid solubilization of the thermoplastic in the epoxy.

The differentially soluble thermoplastics of the subject invention generally show little or no solubility under prepregging conditions as well. It is preferable that under the conditions of fiber impregnation as in U.S. Pat. No. 3,784, 433, not more than a minimal amount, for example less than 30 weight percent of the thermoplastic dissolves. It is expected, for example, that some or all of the very small, i.e. 0.05 to 2 μm particles may dissolve under these conditions. However, the majority, and preferably substantially all the thermoplastic will remain in particulate form. The presence of substantial quantities of particulate thermoplastic may be assessed microscopically. However the best test of suitability, provided that the conditions of solubility at the mixing and cure temperatures are met, is to measure the compression after impact (CAI) strength of composites prepared from the prepreg. This strength, when measured according to Boeing test method BSS 7260 should be greater than 40

Ksi, preferably greater than 45 Ksi, and more preferably greater than 50 Ksi after an impact of 1500 in-lb/per inch of laminate thickness.

By the term "amorphous polysulfone" is meant those polymers which contain predominately ether, alkylene, and sulfone groups interspersed between arylene residues. Such polysulfones, sometimes called polyethersulfones, may be prepared by the processes taught in U.S. Pat. Nos. 4,175,175, and particularly 3,647,751, for example. Polysulfones containing ether and alkylene groups in addition to sulfone groups are predominately amorphous, and are suitable candidates for the practice of the subject invention. Such polysulfones are prepared by polymerization of one or more diphenols such as 4,4'-dihydroxydiphenylsulfone, bisphenol A, and 4,4'-dihydroxybiphenyl with one or more dihaloaromatics such as 4,4'-dichloro- or 4,4'-difluorodiphenylsulfone, 4,4'-dichlorodiphenylmethane, 4,4'-dichlorobiphenyl, 4,4'-dichlorodiphenylether, and the like. When more than two reactive monomers are utilized, the mode of addition may be simultaneous, whereupon heteric polymers may be obtained, or it may be sequential with respect to one or more monomers whereupon block or block heretic copolymers may be obtained. Preferably, the polysulfone is prepared by the polymerization of 4,4'-bis[4-chlorophenylsulfonyl]biphenyl:

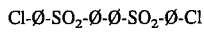

Cl-Ø-SO$_2$-Ø-Ø-SO$_2$-Ø-Cl and bisphenol S:

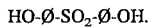

HO-Ø-SO$_2$-Ø-OH.

The polymerization is conducted in such a manner that the resulting polysulfones (polyethersulfones) have glass transition temperatures Tg, of greater than 200° C., preferably greater than 230° C., and most preferably in excess of 250° C. The Tg of the preferred polysulfone, available from Imperial Chemical Industries as HTA polysulfone, is approximately 265° C.

Polysulfones containing linking groups other than alkyl and ether may also be of use in the subject invention provided that the degree of crystallinity is low, i.e. less than 10 percent or preferably less than 5 percent. Preferably, the thermoplastic is completely amorphous.

The thermoplastic may be reactive terminated or endcapped with groups which do not react with epoxy resins such as phenoxy or alkoxy groups. The preferred polysulfone is encapped. Such endcapping methods are well known to the art, and generally occur by introducing a monofunctional reagent, for example 4-hydroxyphenylphenylmethane or 4-chlorophenylsulphonylbenzene into the reaction mixture. Alternatively, hydroxyl terminated polysulfones may be capped following polymerization by well know capping methods, for example by metallation with alkali metal or strong base followed by reaction with an alkyl halide.

The amount of differentially soluble amorphous polysulphone necessary to achieve maximum toughness may vary depending upon the choice of other resin system components, but is generally from ten to about 50 weight percent based on total resin weight exclusive of fiber reinforcement. Most preferably, the amount of polysulfone is between 15 and 25 weight percent. Higher amounts may result in even tougher systems, but at the expense of ease of processing and use. Lower amounts may be useful, particularly in conjunction with a soluble thermoplastic, i.e. one which is totally or at least substantially soluble at the mixing temperature. Such thermoplastics include lower molecular weight polysulfones, polyetherimides, and thermoplastic polyimides, for example.

The differentially soluble amorphous polysulfones must be finely divided. Preferably, not more than 10 percent of the particles are larger than 30 µm, essentially none are larger than 50 µm, and 95 percent are smaller than 35 µm. More preferably, most particles are smaller than 25 µm with median particle sizes of 5–18 microns most preferred. On a weight percentage basis, only a relatively small amount, i.e. less than 15 weight percent of the particles are smaller than 1 µm. Again on a weight basis, preferably about 80 percent by weight of the particles should lie between 2 and 20 µm in size.

These fine particle sizes may be achieved by conventional methods, for example by ball milling, sand milling, jet milling, etc., either at room temperature or at cryoscopic temperatures. Alternatively, the particles may be produced by size reduction methods from solution, for example spray drying; from spray drying the mist produced by impinging a high velocity solution of the thermoplastic against a spinning disk; or by solution precipitation, especially under conditions of high shear. The particles produced by these methods, particularly solution precipitation, have more nearly spherical particle shapes and hence higher weight to surface area ratios. These particles make possible use of higher amounts of thermoplastic than when methods producing small particles of irregular shape and surface are used.

The differentially soluble amorphous polysulfone thermoplastic powders are introduced into melted epoxy resin at the mix temperature. As the mix temperature solubility is low, long mixing times are feasible, resulting in a very uniform product. If soluble thermoplastics are also used, they may be introduced before, during or after the differentially soluble polysulfone. Generally catalysts are added toward the end of the mixing. The product is then melt cast or extruded (coated) into thin films of from 10 µm to 200 µm in thickness depending upon the desired resin content of the finished prepreg.

It has been observed that when non-ideal curing conditions are utilized, that the gel time of the epoxy may be of such duration as to allow the differentially soluble amorphous polysulfone to not only dissolve during cure, but also to diffuse in a relatively uniform manner away from the interply area. Prepregs cured under these conditions may be tougher than the base resin system, but do not achieve the exceptionally high impact resistance possible through correct practice of the subject invention.

It has been surprisingly discovered that by adjusting the gel time of the thermosetting resin system, migration of the amorphous polysulfone from the interply area may be substantially prevented. It is further believed that proper adjustment of the gel time results in a composite having a concentration gradient of amorphous polysulfone whose maximum is centered medially between the plies.

Thus it is believed that this technique is a general one, and can be used with any base resin system including bismaleimide and cyanate ester resins, and with any differentially soluble engineering thermoplastic, so long as there is no substantial solubility of thermoplastic particles at the resin mixing temperature and substantial solubility, preferably total solubility, at the curing temperature, and further provided that the gel time of the resin system is such that substantial migration of thermoplastic away from the interply area is prevented while substantial or total solubility is facilitated.

To assess the suitability of a particular resin system for the practice of the subject invention, first the differential solubility of the thermoplastic in the base resin system must be established. Next, a series of similar resin systems containing increasing amounts of catalysts and therefore continually decreasing gel times may be prepared. Finally, fiber reinforced prepregs may be prepared from the resin systems, layed up into composites, cured and tested for compression strength after impact. Gel times which allow the unique compromise between total solubility and thermoplastic migration which allows establishment of the aforesaid concentration gradient will result in composites having the greatest CAI values. Typical bismaleimide and cyanate resin systems with which this technique of trapping a differentially soluble thermoplastic in the interply layer and forming a thermoplastic concentration gradient may be found, for example in U.S. Pat. Nos. 4,110,364, 4,100,140, and 4,644,039, and European patent EP-A-0 230 631.

Differentially soluble thermoplastics may be selected from polysulfone, polyethersulfone, polyphenylene oxide, and from any classes of thermoplastic which have sufficiently high glass transition temperatures and possess the required differential solubility. In general, very low molecular weight thermoplastics, for example those with molecular weights lower than about 8,000–12,000 are not suitable, as they will generally be fully dissolved at the mix temperature. Crystalline thermoplastics are also in general not suitable, and thus polymers such as polyetherketones would not be expected to work due to their limited solubility at the curing temperature. The glass transition temperature of the thermoplastic should be at least 180° C., preferably greater than 200° C., and most preferably greater than 250° C. An assessment of whether any particular thermoplastic is suitable may be made as described hereinbefore with the differentially soluble amorphous polysulfones.

The epoxy resins are not used alone, but are combined with suitable curing agents, catalysts, comonomers, rheology control agents, tackifiers, fillers, elastomeric toughening agents, reactive diluents, soluble thermoplastics and other additives well known to those skilled in the art. By the term curing agent is meant a monomer or oligomer which is reactive with the epoxy group. Generally such curing agents have relatively low molecular weights, and reactive functionalities which are phenolic hydroxyl, primary or secondary amine, amide, or anhydride. Preferable curing agents are the monomeric and oligomeric amine functional polyarylenes wherein between the arylene groups are simple covalent bridges such as in the diaminodiphenyls, or connecting groups selected from the group consisting of alkylene of from 1–8 carbon atoms, ether, sulfone, ketone, carbonate, carboxylate, carboxamide and the like.

Particularly preferred are the amine functional polyarylenes wherein the connecting groups are alkylene, ether, sulfone, and ketone. Such polyarylenes and synthetic methods for preparing them may be found in U.S. Pat. Nos. 4,175,175 and 4,656,208 which are herein incorporated by reference. The molecular weights of the preferred curing agents is less than about 800, preferably less than about 600, and most preferably less than about 450. Particularly preferred as curing agents are 3,3'-diaminodiphenylsulfone and 4,4'-diaminodiphenylsulfone, especially the latter. Mixtures of these curing agents may also be utilized. Amino-hydrogen/epoxy group stoichiometry is preferably adjusted to a range between 0.6 and 1.6, more preferably between 0.8 and 1.2, and most preferably from about 1.0 to 1.2.

Phenolic hardeners include the simple bisphenols such as bisphenol A, bisphenol F, bisphenol S, and bisphenol K; the phenolated dicyclopentadiene oligomers whose preparation is taught by U.S. Pat. No. 3,536,734; the phenolic hydroxyl functional phenol and cresol derived novolacs, and the phenol terminated polyarylenes similar to those described in the previous paragraph. Hardeners having three or more phenolic hydroxyls result in resins having higher crosslink density. Examples of such curing agents are, in addition to several of the novolac resins, 1,1,2,2-tetrakis[4-hydroxyphenyl]ethane, tetrahydroxybenzophenone, and tetrahydroxybiphenyl.

Also useful as curing agents are the amides such as sulfanilamide and very low molecular weight polyamide oligomers, and the anhydrides. Examples of such curing agents may be found in the references cited earlier.

Catalysts may sometimes be necessary when formulating epoxy resin systems. Such catalysts are well known to those skilled in the art. When amine functional curing agents are utilized, catalysis is generally optional, and catalysts such as tertiary amines and complexes of amines such as monoethylamine with borontrifluoride may be useful. However when phenolic functional curing agents or toughening oligomers are used, the epoxy phenol reaction must be catalysed. Suitable catalysts are the phosphines, for example triphenylphosphine and hexyldiphenylphosphine, and the N-[3-phosphoranylidenyl-1-aza-cyclopenta-2,5-dione] radical-containing compounds prepared by the reaction of a triorganophosphine with a maleimide, for example. the maleimides of p-aminophenol or 4,4'-methylenedianiline, generally in the presence of an inert solvent such as methylene chloride or N-methylpyrollidone, or as taught by U.S. Pat. No. 3,843,605.

Comonomers may be defined as relatively low molecular weight monomers or oligomers which, during cure of the subject invention epoxy resin systems, exhibit substantial reaction with themselves or with non-epoxy functional system components. Some reaction with epoxy functionality may also occur. Examples of such comonomers, which may be present in a minor amount, are unsaturated compounds such as the allylphthalates, styrene, and diallyl- and dipropenylbisphenols; the maleimides, for example the maleimides of 4,4'-methylenedianiline, toluenediamine, 2,2,4-trimethylhexanediamine and other amino-functional intermediates including the amino terminated polyarylene oligomers described earlier; and the cyanate functional resins, for example those prepared by the reaction of a cyanogen halide with a bis- or higher functional phenol such as the bisphenols, and in particular, the phenolated dicyclopentadienes cited earlier. These cyanate comonomers may react with themselves to form triazine structures, or with epoxy groups to form oxazolinyl linkages. Comonomers as herein defined are generally used in very low amounts, for example less than 20 weight percent, if at all.

Elastomeric toughening agents useful in the practice of the invention include the functionalized butadiene/acrylonitrile elastomers. Such elastomers may be hydroxyl, carboxyl, and amino functional, and are available commercially from the B. F. Goodrich Co., Akron, Ohio, under the tradename HYCAR®, and the lightly crosslinked, lightly carboxylate functional ABS rubbers available from Goodrich under the tradename PROTEUS rubber. Also suitable are the functionalized polysiloxane elastomers such as those disclosed by J. S. Riffle et al in the article "Elastomeric Polysiloxane Modifiers for Epoxy Networks: Synthesis of Functional Oligomers and Network Formation Studies," *Epoxy Resin Chemistry II*, Bauer, Ed., ACS Symposium Series, American Chemical Society, Washington, D.C. Especially suitable are the secondary amine terminated polysiloxanes as taught in U.S. patent application Ser. No. 07/100514.

The elastomeric toughening agents may be added in such quantity and in such a manner as to homogenously modify the epoxy network. However, in such cases, the cured resin modulus and thermal stability is negatively affected. The dry glass transition temperature of the overall resin system also decreases. Tougher systems are prepared by adding the elastomer in the form of discrete particles, whether formed in situ by crosslinking with the epoxy matrix resin or by separate formation and incorporation into the resin system by traditional techniques such as three roll milling. The amount of elastomeric toughener may be varied over a wide range, for example from 0.5 to about 50 weight percent of the total resin system, but is preferably lees than 10 percent by weight.

The thermoplastic polyimides useful in the subject invention in conjunction with a differentially soluble thermoplastic should preferably be totally or substantially soluble in the other resin system components, at least during the cure cycle. Certain polyimides exhibit particularly enhanced ability to toughen epoxy systems when used as the soluble thermoplastic. These polyimides generally have less ordered structure than others by virtue of the asymmetry of their dianhydride and diamine comonomers. In particular, it has been found that these polyimides preferably should have a molecular weight of about 20,000 Daltons or more, and have a repeating structure in which not more than 90 percent of the non-phthalimide carbons are in aromatic structures. By "phthalimide" carbons are meant the carbonyl carbon atoms which are present in the imide rings of the polyimides, and which are derived from the anhydride group carbons, whether these carbons are originally contained in aromatic anhydride groups or are derived from aliphatic dianhydrides. Each imide group obtained by the reaction of an anhydride group with a primary amine will thus contain two "phthalimide" carbon atoms. The term "non-phthalimide" carbons includes all carbons in the repeating units other than the "phthalimide" carbons.

The thermoplastic-polyimides useful in the invention may be prepared through the reaction of a dianhydride with a diamine. The reaction may occur neat, at temperatures above the melting points of at least one of the components, or in solution. Through careful manipulation of the molar quantities of dianhydride and diamine, the molecular weight of the resulting polyimide may be adjusted over a fairly wide range. The use of catalysts, for example pyridine, may be useful in facilitating the polyimide synthesis. Methods of synthesis of polyimides may be found in the Kirk-Othmer *Encyclopedia of Chemical Technology*, Vol. 18, Wiley-Interscience, pages 704–719.

Polyimides useful in the subject invention may be made, for example, by condensing an aromatic dianhydride such as pyromellitic dianhydride, 3,3'-bis[phthalyl]ether dianhydride, or benzophenone tetracarboxylic acid dianhydride (BTDA) with an aliphatic diamine such as 1,6-hexanediamine or 2,2,4-trimethylhexane-1,6-diamine; with an aromatic diamine containing significant aliphatic or cycloaliphatic structure such as 1,6-bis[4-aminophenyl]hexane or 5(6)-amino-1-(4'-aminophenyl)-1,3,3-trimethylindane (AATI).

Useful polyimides may also be prepared through the reaction of monomers wherein the dianhydride moiety contains aliphatic or cycloaliphatic carbon atoms, and the amino groups are attached to aromatic systems. Mixtures of such monomers may also be useful. Also useful are polyimides wherein all or part of either the dianhydride or diamine or both contain interspersed. low molecular weight hereto groups such as oxide, sulfide, sulfone, and carbonate and the like. When such hetero groups are present, each atom in the group which directly bridges aromatic groups is counted as a carbon atom in making the calculations described above and exemplified below. Thus oxide and sulfide groups would be treated as if they were methylene groups, and carbonate groups as if they were propylene groups. Such polyimides have repeating units characterized by the structure

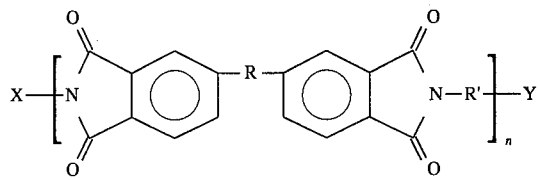

wherein X and Y are end groups which may be a residue of one of the reactive monomers such as

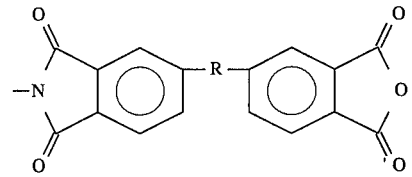

or may be a monofunctional capping agent which is reactive with amino or anhydride functionality; n is an integer such that the molecular weight of the polyimide is greater than about 20,000; and wherein R and $R^1$ are the non-anhydride and non-amino monomer residues, respectively.

Particularly preferred are those polyimides which, because of the asymmetry of the dianhydride or diamine, particularly the latter, possess a lesser degree of crystallinity or are wholly amorphous. Polyimides based on BTDA and AATI are preferred. Such polyimides are available commercially under the trademark MATRIMID® 5218 from the Ciba-Geigy Corporation, and have an inherent viscosity of >0.62 dl/g when measured at 0.5 weight percent concentration in N-methylpyrollidone at 25° C. The molecular weight of these most preferred polyimides is greater than 20,000 Daltons, preferably greater than 50,000 Daltons, and most preferably in the range of about 100,000 Daltons.

The resin system components of the subject invention, other than the differentially soluble thermoplastic, are mixed and blended in the conventional manner. When mixtures of liquid epoxy resins and solid epoxy resins are utilized, the latter may be slurry mixed into the liquid epoxy in order that the final resin system display adequate tack and drape. The slurry mixing temperature is preferably less than 90° C., more preferably between 40° C. and 80° C. In such a process, the solid epoxy should preferably be in the form of particles, most preferably spherical or nearly spherical in shape, having a mean size of less than 10 μm, preferably less than 5 μm and most preferably less than 2 μm. If a polyimide or other soluble thermoplastic is used, it may be added during mixing or may be melted into the mix prior to incorporation of other ingredients. Preferably, all of the soluble thermoplastic will dissolve in the resin mix, although it is permissable to utilize resin mixtures still containing non-differentiay soluble thermoplastic particles provided that the particles will be less than 30 μm in size, preferably less than 20 μm, and most preferably less than 10 μm. The differentially soluble thermoplastic is then slurried into the resin system, generally under conditions of high to moderate shear.

The conventional epoxy system mixing temperature is generally from 60° C. to 130° C. It is within this range that the differentially-soluble amorphous polysulfone is added, although it may be advantageously added at a lower mix temperature provided the resin viscosity is suitable. The viscosity may be decreased by addition of solvents which are removed prior to filming. However this method is not preferred as complete removal of volatiles is difficult.

Cure of composites prepared by laying up a number of plies of prepreg takes place according to conventional curing schedules, for example for several hours at temperatures from 150° C. to 200° C., preferably 170° C. to 180° C. The distribution of differentially soluble thermoplastic in the finished prepreg is not known with certainty. During cure the differentially soluble thermoplastic substantially dissolves in the epoxy resin, but after curing is believed to form an interply layer of thermoplastic rich material. In the best composites from such prepregs, this interply layer is undetectable by means of conventional optical microscopy, but a gradient of increased thermoplastic concentration may be demonstrated by reflective ultraviolet fluorescence microscopy. It is further believed that the presence of this layer is responsible for the extraordinary increase in toughness which results when differentially soluble amorphous thermoplastics meeting the requirements of the subject invention are utilized in the preparation of fiber reinforced prepregs by the film impregnation method as disclosed in U.S. Pat. No. 3,784,433. Unfortunately, the resin systems of the present invention are difficultly solution impregnable, but the use of solution impregnation followed by coating of an additional layer containing the polysulfone, whether by traditional hot melt techniques, by printing techniques such as flexography, or by spraying such a film on the prepreg are available as prepreg production methods. An acceptable solvent for solution impregnation is acetone.

The toughened epoxy resin systems of the subject invention may be used as film adhesives or as matrix resins for the preparation of fiber reinforced prepregs, preferably the latter use. In their most preferred application the epoxy resin systems of the subject invention are used to impregnate carbon fibers for use in laying up carbon fiber reinforced composites. Such composites have extensive uses in the aerospace and transportation industries.

By the term "carbon fibers" are meant those fibers prepared by pyrolysing acrylonitrile fibers or carbon containing pitches to produce fibers whose content is virtually all carbon, regardless of its molecular structure. Such fibers in the past, have been designated as "graphite", "carbon/graphite", "C/G" or "carbon" fibers. All such fibers are generally now termed "carbon" fibers. Carbon fibers may be supplied in the form of bundles of unidirectional fibers, or tows, or woven into cloth. When supplied in the form of unidirectional tows, many of such tows are used to prepare planar, unidirectional prepregs by impregnation with a suitable matrix resin.

To impregnate the parallel tows of fibers or fabric of woven carbon fibers, the film impregnation method is generally used, as taught by U.S. Pat No. 3,784,433. In this method, thin films of uncured matrix resin are prepared and supported temporarily by release papers or films. Such matrix resin films may be of a variety of thicknesses and weight per unit surface area, in order to prepare resin impregnated fibers having the appropriate resin content. This resin content may vary from about 10 to about 60 weight percent, but is preferably from 25 to about 45 weight percent, and most preferably from 30 to about 40 weight percent based on the total prepreg weight.

Following preparation of the neat resin films, the films are stripped of their support and fed along with the fiber substrate through a series of heated rollers or their equivalents, to melt and force the liquid resin into the fiber substrate. "Filming" as this technique is called, may be done from one side or from both sides of the fiber substrate by adjusting the weight of the film appropriately. In the practice of the subject invention, it is most desirable that dual filming be utilized, although good results have also been obtained using the single film technique.

Following their impregnation, the prepregs are supported on both sides by release paper or film and stored, generally at subambient temperature, for future use. In use, the prepregs are stripped of their release paper backing and numerous plies are stacked together. Following this stacking, or "layup", the assembly is generally "debulked" by applying vaccuum, following which the assembly is cured into a composite by curing at elevated temperature, generally under modest pressure.

Most desirably, the composite will exhibit high modulus, high tensile and compressive strength, resistance to impact-induced-damage, and excellent solvent resistance. Moreover, it is desirable that these properties be maintained under conditions of heat and cold, and high and low humidity. Ideally, the compressive strength of the composite after severe impact will not differ significantly from its preimpact value. In practice, however, these compression after impact (CAI) values are considerably less than the preimpact values. Thus, CAI values are of major importance in evaluating prepregs and their usefulness in preparing commercially viable composites. The prepregs of the subject invention are capable of routinely preparing composites having 1500 in-lb/in CAI values of greater than 40 Ksi with more preferred embodiments having CAI greater than 45 Ksi, both these values without tertiary (i.e. elastomeric particle) toughening which may result in further improvement.

The examples which follow serve to illustrate the practice of the subject invention, and should not be construed as limiting the scope of the invention in any way. All parts are by weight unless indicated to the contrary.

EXAMPLE 1 COMPARATIVE

An epoxy resin composition was prepared from 500 parts of the bisglycidyl ether of bisphenol F, 1500 parts of an epoxy resin derived from phenolated dicyclopentadiene as taught by U.S. Pat. No. 3,536,734 (DCPD epoxy) and having an epoxy functionality of approximately 2.2 and 100 parts DER 662. The resins were heated to 270° F. (133° C.) and agitated until homogenous. After cooling to 160° F. (71° C.), 854 parts of 4,4'-diaminodiphenylsulfone curing agent and 6 parts $BF_3MEA$ catalyst were added and the resin stored for coating.

EXAMPLE 2

The procedure of Example 1 was followed using 466 parts biphenol F epoxy, 933 parts DCPD epoxy, and 599 parts diaminodiphenylsulfone, but to the resin system at 160° F. (71° C.) was added 500 parts of ICI HTA polysulfone which had been ground to an average particle size of 13 μm as determined by a laser particle size analyzer. Mixing was continued for from 15–30 minutes wereupon no more than slight swelling of the polysulfone was observed.

EXAMPLE 3

Example 2 was followed, but 250 parts MATRIMID® 5218 polyimide thermoplastic and 250 parts HTA polysulfone added. The polyimide exhibited partial to total solubility at the 160° F. (71° C.) addition temperature, while the HTA appeared not to dissolve.

EXAMPLE 4 COMPARATIVE

Example 2 was followed, but PEEK® 150 polyether ketone thermoplastic available from ICI, and having an average particle size of 8.5 μm was substituted for the HTA polysulfone.

EXAMPLE 5 COMPARATIVE

A resin formulation was prepared as in Example 2, using 500 parts of DCPD epoxy, 250 parts bisphenol F epoxy, and 330 parts 4,4'-diaminodiphenylsulfone. To this mixture was added, at 150° F. (66° C.), 270 parts of a polyimide prepared from BTDA, MDA, and TDA, having a non-phthalimide carbon content which contains between 90 and 92 percent aromatic carbons, and available commercially from Lenzing AG as polyimide P84. The polyimide did not appear to swell or dissolve.

EXAMPLES 6–8

In a manner analogous to Example 2, compositions were prepared containing 15, 25, and 30 weight percent HTA. The composition containing 15 weight percent HTA also contains a filler known as "Toray pearls", a ground, cured epoxy resin, at 5 weight percent concentration.

EXAMPLE 9 COMPARATIVE

In a manner analogous to Example 2, a composition was prepared containing 10 weight percent HTA polysulfone. The composition also contained 10 weight percent of ground, cured epoxy as a filler.

EXAMPLE 10 COMPARATIVE

In a manner analogous to Example 2, a resin composition containing 20 weight percent Mitsui TPI, a thermoplastic polyimide was prepared.

EXAMPLE 11

In a manner analogous to Example 2, a resin composition containing 20 weight percent of E 1000 polysulfone, a product of BASF Aktiengesellschaft and having a molecular weight Mw of about 29,000 Daltons was prepared.

EXAMPLE 12

A resin system was prepared in accordance with Example 2 but containing 1240 g DCPD epoxy, 310 g BiBphenol F epoxy, 450 g of 4,4'-diaminodiphenylsulfone, and 500 g HTA amorphous polysulfone having a mean particle size of 5.9 μm. Prepregs were prepared from intermediate modulus carbon fiber available from BASF Corporation designated as Celion® G40-800X, having an areal fiber weight of 145 g/m².

Prepreg and Composite Preparation

Films were prepared from each of the resins in the Examples and utilized to impregnate unidirectional IM-7® intermediate modulus carbon fiber available from Hercules, using the dual filming technique. Resin content was nominally 33 weight percent based on the weight of the finished prepregs. Following preparation of the prepregs, quasiisotropic laminates [+45,0,−45,90]$_{4s}$ were prepared and tested for compression after impact (CAI) using Boeing test method BSS 7260. The results of the tests are presented below. CAI values presented were measured after an impact of 1500 in-lb/in.

TABLE I

| Example | Thermoplastic Type | Amount | CAI | Damage Area[1] |
|---|---|---|---|---|
| 1 (Comparative) | None | None | 37 | 10.3 |
| 2 | Amorphous polysulfone[2] | 20% | 48.3 | 5.85 |
| 3 | Amorphous polysulfone polyimide | 10% 10% | 49.9 | — |
| 4 (Comparative) | PEEK | 20% | 24 | 25.7 |
| 5 (Comparative) | polyimide,[3] | 20% | —[4] | —[4] |
| 6 | Amorphous polysulfone[2] | 15% | 48.6 | 5.23 |
| 7 | Amorphous polysulfone[2] | 25% | 47.2 | 4.84 |
| 8 | Amorphous polysulfone | 30% | 55.2 | 3.68 |
| 9 (Comparative) | Amorphous polysulfone | 10% | 31.0 | 14.8 |
| 10 (Comparative) | Mitsui TPI | 20% | 23.0 | 35.5 |
| 11 | E1000 PES | 20% | 43.0 | 7.10 |
| 12 | Amorphous polysulfone | 20% | 43.5 | 8.39[5] |

[1]Damage area in cm².
[2]Differentially soluble HTA amorphous polysulfone.
[3]Polyimide 2080, a polyimide containing residues of TDA, MDA, and benzophenonetetracarboxylic dianhydride, available from Lenzing, A.G.
[4]Delamination upon impact, no testing possible.
[5]Change in fiber over other examples.

The table illustrates the advantages of the subject invention. Example 3 employing 20 weight percent of a differentially soluble amorphous polysulfone results in an improvement in CAI of about 30 percent over the base, unmodified epoxy resin system, while comparative example 4, 5, and 10 show that other thermoplastics, at the same concentration, actually cause a decrease in CAI. Comparison example 9 shows that there appears to be a lower limit to the amount of polysulfone which is effective, with a ten weight percent concentration actually decreasing the CAI of the composites. Example 3, however, shows that this same lower limit of ten weight percent of differentially soluble polysulfone is effective when combined with another soluble thermoplastic. Example 11 shows that differentially soluble thermoplastics other than HTA are useful in increasing the toughness of epoxy resins.

It must be noted that these systems are all monophasic. The phase separation noted by Bucknall and Partridge upon cure of their initially melt-homogenous systems is not observed in the compositions of the subject invention.

The embodiments of the invention in which an exclusive privilege or property is claimed are defined as follows:

1. A method for increasing the toughness of a cured epoxy resin composition, comprising the steps of:
   (1) adding to a curable epoxy resin system from 15 to 50 weight percent, based on the total composition, of a particulate amorphous thermoplastic under conditions wherein a substantial amount of the amorphous thermoplastic does not dissolve in the curable epoxy resin system; then
   (2) curing the so-formed particulate amorphous thermoplastic containing epoxy resin system by heating the system to cure temperature under conditions whereby the particulate thermoplastic dissolves in the epoxy resin system prior to or contemporaneously with the epoxy resin gel time.

2. The method of claim 1, wherein the particulate amorphous thermoplastic has a mean particle size of from 2 μm to 35 μm.

3. The method of claim 1, wherein the particulate amorphous thermoplastic has a mean particle size of from 5 μm to 18 μm.

4. The method of claim 1, wherein the amorphous thermoplastic is an amorphous polysulfone.

5. The method of claim 1, wherein the curable epoxy resins system comprises an epoxy resin and a curing agent.

6. A method for increasing the toughness of a cured epoxy resin composition, comprising the steps of:
  (1) adding to a curable epoxy resin system (i) from 10 to 30 weight percent, based on the total composition, of a particulate amorphous thermoplastic and (ii) from 5 to about 20 weight percent, based on the total composition, of a soluble thermoplastic, under conditions wherein a substantial amount of the amorphous thermoplastic does not dissolve, and the soluble thermoplastic substantially dissolves, in the curable epoxy resin system; then
  (2) curing the so-formed epoxy resin system by heating the system to cure temperature under conditions whereby the particulate thermoplastic dissolves in the epoxy resin system prior to or contemporaneously with the epoxy resin gel time.

7. The method of claim 6, wherein the particulate amorphous thermoplastic has a mean particle size of from 2 μm to 35 μm.

8. The method of claim 6, wherein the particulate amorphous thermoplastic has a mean particle size of from 5 μm to 18 μm.

9. The method of claim 6, wherein the amorphous thermoplastic is an amorphous polysulfone.

10. The method of claim 6, wherein the soluble thermoplastic is a thermoplastic polyimide.

11. The method of claim 6, wherein the curable epoxy resins system comprises an epoxy resin and a curing agent.

12. A heat-curable epoxy resin system comprising an uncured epoxy resin system containing from about 15 to about 50 weight percent, based on the total composition, of a particulate amorphous thermoplastic which is soluble in the epoxy resin system at the cure temperature thereof, prepared by adding the particulate amorphous thermoplastic to the uncured epoxy resin system under conditions wherein a substantial amount of the amorphous thermoplastic does not dissolve in the curable epoxy resin system.

13. The heat-curable epoxy resin system of claim 12, wherein the particulate amorphous thermoplastic has a mean particle size of from 2 μm to 35 μm.

14. The heat-curable epoxy resin system of claim 12, wherein the particulate amorphous thermoplastic has a mean particle size of from 5 μm to 18 μm.

15. The heat-curable epoxy resin system of claim 12, wherein the amorphous thermoplastic is an amorphous polysulfone.

16. The heat-curable epoxy resin system of claim 12, wherein the curable epoxy resins system comprises an epoxy resin and a curing agent.

17. A heat-curable epoxy resin system comprising an uncured epoxy resin system containing
  (i) from about 10 to about 30 weight percent, based on the total composition, of a particulate amorphous thermoplastic which is soluble in the epoxy resin system at the cure temperature thereof, and
  (ii) from 5 to about 20 weight percent, based on the total composition, of a soluble thermoplastic, under conditions wherein a substantial amount of the amorphous thermoplastic does not dissolve, and the soluble thermoplastic substantially dissolves, in the curable epoxy resin system; then prepared by adding the particulate amorphous thermoplastic and the soluble thermoplastic to the uncured epoxy resin system under conditions wherein a substantial amount of the amorphous thermoplastic does not dissolve, and the soluble thermoplastic substantially dissolves, in the curable epoxy resin system.

18. The heat-curable epoxy resin system of claim 17, wherein the particulate amorphous thermoplastic has a mean particle size of from 2 μm to 35 μm.

19. The heat-curable epoxy resin system of claim 17, wherein the particulate amorphous thermoplastic has a mean particle size of from 5 μm to 18 μm.

20. The heat-curable epoxy resin system of claim 17, wherein the amorphous thermoplastic is an amorphous polysulfone.

21. The heat-curable epoxy resin system of claim 17, wherein the soluble thermoplastic is a thermoplastic polyimide.

22. The heat-curable epoxy resin system of claim 17, wherein the curable epoxy resins system comprises an epoxy resin and a curing agent.

23. A prepreg comprising (a) carbon fiber reinforcement in an amount of from about 30 to about 90 weight percent based on the weight of the prepreg, and (b) a heat-curable epoxy resin system comprising an uncured epoxy resin system containing from about 15 to about 50 weight percent, based on the total composition, of a particulate amorphous thermoplastic which is soluble in the epoxy resin system at the cure temperature thereof, prepared by adding the particulate amorphous thermoplastic to the uncured epoxy resin system under conditions wherein a substantial amount of the amorphous thermoplastic does not dissolve in the curable epoxy resin system.

24. The prepreg of claim 23, wherein the amorphous thermoplastic is added to the curable epoxy resin system in an amount of from about 20 to about 30 weight percent, based on the total composition.

25. The prepreg of claim 23, wherein the particulate amorphous thermoplastic has a mean particle size of from 2 μm to 35 μm.

26. The prepreg of claim 23, wherein the particulate amorphous thermoplastic has a mean particle size of from 5 μm to 18 μm.

27. The prepreg of claim 23, wherein the amorphous thermoplastic is an amorphous polysulfone.

28. The prepreg of claim 23, wherein the curable epoxy resins system comprises an epoxy resin and a curing agent.

29. A prepreg comprising (a) carbon fiber reinforcement in an amount of from about 30 to about 90 weight percent based on the weight of the prepreg, and (b) a heat-curable epoxy resin system comprising an uncured epoxy resin system containing
  (i) from about 10 to about 30 weight percent, based on the total composition, of a particulate amorphous thermoplastic which is soluble in the epoxy resin system at the cure temperature thereof, and
  (ii) from 5 to about 20 weight percent, based on the total composition, of a soluble thermoplastic, under conditions wherein a substantial amount of the amorphous thermoplastic does not dissolve, and the soluble thermoplastic substantially dissolves, in the curable epoxy resin system; then
prepared by adding the particulate amorphous thermoplastic and the soluble thermoplastic to the uncured epoxy resin system under conditions wherein a substantial amount of the amorphous thermoplastic does not dissolve, and the soluble thermoplastic substantially dissolves, in the curable epoxy resin system.

30. The prepreg of claim 29, wherein the amorphous thermoplastic is added to the curable epoxy resin system in an amount of from about 20 to about 30 weight percent, based on the total composition.

31. The prepreg of claim 29, wherein the particulate amorphous thermoplastic has a mean particle size of from 2 µm to 35 µm.

32. The prepreg of claim 29, wherein the particulate amorphous thermoplastic has a mean particle size of from 5 µm to 18 µm.

33. The prepreg of claim 29, wherein the amorphous thermoplastic is an amorphous polysulfone.

34. The prepreg of claim 29, wherein the soluble thermoplastic is a thermoplastic polyimide.

35. The prepreg of claim 29, wherein the curable epoxy resins system comprises an epoxy resin and a curing agent.

* * * * *